Figure 5:
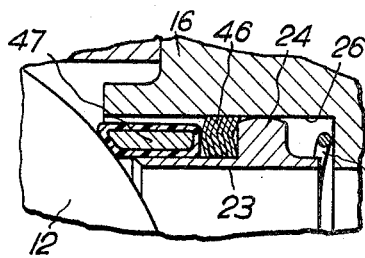

Aug. 16, 1966     S. G. SHAND     3,266,769
FLUID CONTROLLING VALVES WITH ROCKABLE SEALING MEANS
Filed Dec. 13, 1962     2 Sheets-Sheet 1
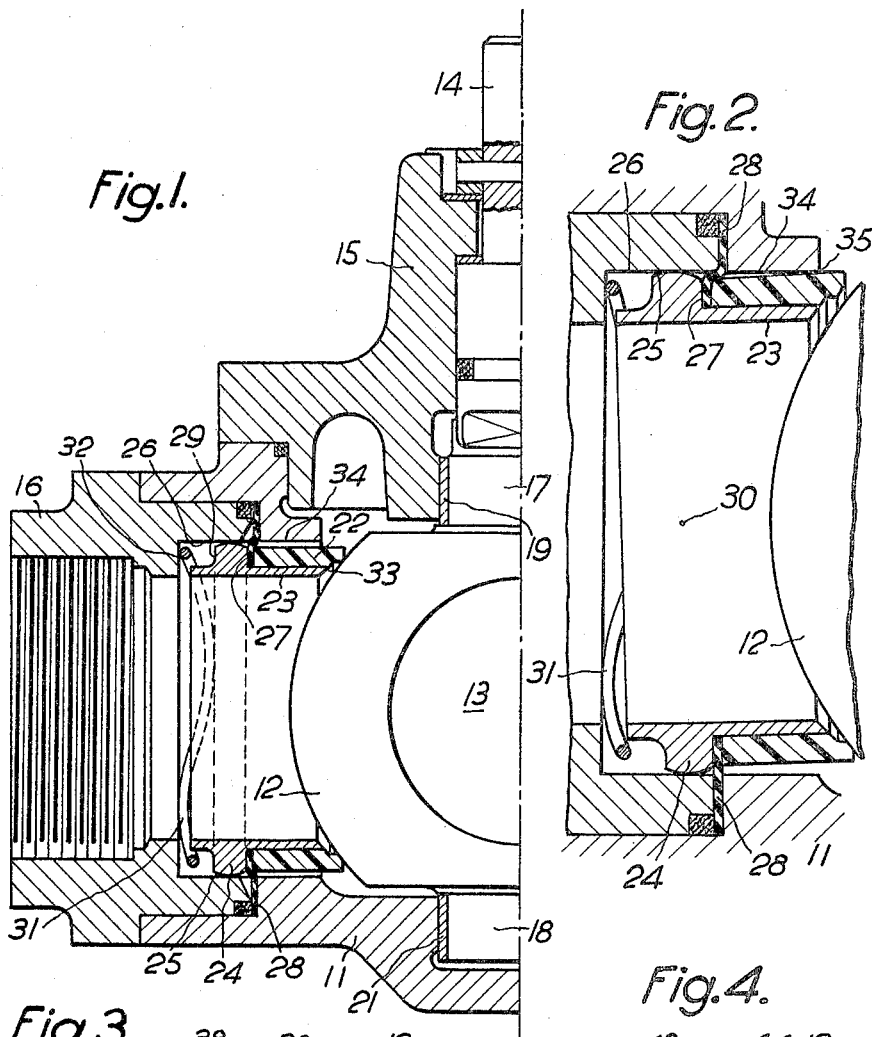
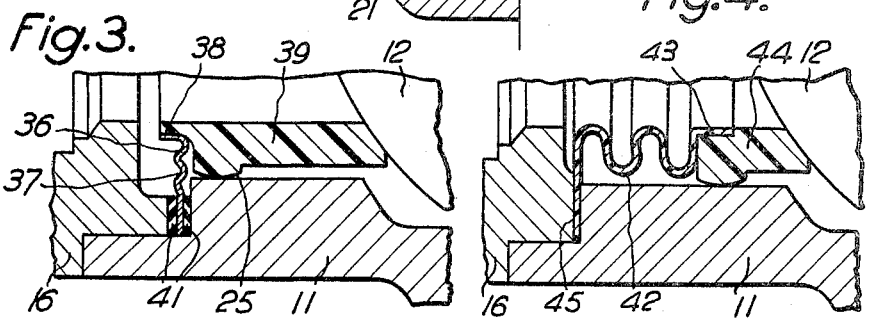
Inventor
Stanley G. Shand
By Gustav H. Emery
Atty.

Inventor
Stanley G. Shand.

3,266,769
FLUID CONTROLLING VALVES WITH
ROCKABLE SEALING MEANS
Stanley G. Shand, Hereford, England, assignor to Saunders Valve Company Limited, Cwmbran, Monmouthshire, England, a British company
Filed Dec. 13, 1962, Ser. No. 244,424
Claims priority, application Great Britain, Dec. 14, 1961, 44,926/61
8 Claims. (Cl. 251—172)

This invention relates to valves in which a seating ring which effects the seal between an obturating member which slides relatively to the ring, and the casing of the valve, while being sealed to the casing is pressed axially against the obturating member. Springs have been used to apply this pressure. In addition or instead the pressure of the controlled medium has been used to apply the pressure so that the pressure was proportional to the pressure in the medium.

Various arrangements for sealing such a ring to the casing have been proposed and used in the past. Among them are annular diaphragms, the outer margin of which is sealed to the casing and the inner margin to the ring. Such arrangements which applied to plug cocks are disclosed in patent specifications 2,520,288 and 2,751,185 and which can also be applied to gate valves, not only enable the ring better to adapt itself to small inaccuracies in the form or mounting of the obturating member and thus allow a good seal between the obturating member and ring and therefore between the obturating member and casing to be obtained despite manufacturing inaccuracies and with less axial pressure of the ring, but by giving the ring freedom to move a little with the obturating member make it easier for the ring and obturating member to be separated if the ring should stick to the obturating member.

In these prior constructions after a certain movement of the ring with the obturating member, or in any direction in its own plane if not sticking to the obturating member, the ring comes into contact with the wall of a counterbore or the like in the casing but normally it is clear of this wall. If it is sticking it moves about the axis of the plug in a plug cock and in the path of the gate in a gate valve. The resulting distortion of the diaphragm exerts force somewhat indefinite in direction which include a tendency to pull the ring away from the obturating member starting on one side. If separation has not taken place before the ring contacts the wall much greater forces come into play which include shear across the whole seating area, that is the area of contact between the ring and obturating member.

One purpose of the present invention is to control the movement of the ring in a valve in which the ring has freedom of movement both axially and with the obturating member, in such a way that without preventing the desired freedom of movement, right from the start, forces will arise tending to separate it from the obturating member starting from one point, the forces including a substantial tensile component, i.e., a pulling of the ring away from the obturating member at this point. According to the invention the ring includes in its structure at a substantial distance behind the actual seating area, a substantially rigid annular rib having a convex outer surface which fits with no more than working clearance in a bore in the valve casing, this bore being cylindrical in this region so as not to impede movement of the ring axially, while towards the region of the actual seating area there is substantially greater clearance round the ring structure. Thus there is still freedom of movement of the ring in the region of the seating area both axially and radially, the radial freedom being provided by the ability of the ring structure to rock on any transverse axis through the rib although the latter is always in contact or practically so, with the wall of the bore. Ideally, the convex surface of the rib should be part of a sphere, but working clearance and the small amount of tipping to be provided for will permit some departure from the ideal form.

If now the ring sticks when the obturating member starts to move, since the rib at once contacts with the bore and since it is a substantial distance behind the seating area, the ring structure must rock about a transverse axis through the rib and perpendicular to the direction of movement of the seating area. Such rocking action necessarily involves a pulling of the ring away from the obturating member at the point on the seating area furthest from the point of contact between the rib and bore and correspondingly at least a tendency to pressing of the ring towards the obturating member at the diametrically opposite point on the seating area.

It would be possible to provide the necessary clearance from the location of the rib towards the region of the actual seating area by increasing the diameter of the bore in the valve casing from the region in which the rib has a working clearance towards the actual seating area, but it is usually simpler and therefore preferable to keep the bore of constant diameter and to provide the greater clearance by making the ring structure of sufficiently smaller diameter than the convex surface of the rib over the required portion of its length.

Further features and advantages of the invention will appear from the following description of examples of embodiment illustrated in the accompanying drawings in which FIG. 1 is a half section of a plug cock, taken on the axis of rotation of the plug, having a spherical plug as the obturating member and provided with one form of seating ring arrangement in accordance with the invention, FIG. 2 is a detail of the embodiment of FIG. 1 on an enlarged scale but with the ring structure in an extreme rocked position.

FIGS. 3 to 10 are detail sections showing further ways of sealing the ring structure to the valve casing and further forms of ring structure.

Referring now to FIG. 1, the cock includes a casing 11 in which a plug 12 having a duct 13 through it and a spherical external contour is rotatable. The casing is completed by a bonnet 15 and end connections at each outlet form the casing. One such is shown at 16, internally threaded for connection to a pipe line but this may take other forms, for example externally threaded, or be provided with a flange. The end fitting may be held to the casing by clamping bolts not shown or any other suitable means. It is here assumed that the cock is a straight-through cock; accordingly the duct 13 in the plug is diametrical and another end connection will be provided opposite the connection 16, but the invention is equally applicable to multi-way cocks, with a corresponding number of end connections and disposition of the duct 13.

The axis of rotation of the plug 12 is here determined by integral trunnions 17, 18 journalled in bearings 19, 21 in the casing 11 but in small sizes these trunnions and bearings may be omitted the plug being centered by the seating rings.

With the spherical surface of the plug cooperates, corresponding with each end connection, a seating ring structure comprising a tubular member 22 here forming the actual seating ring, sliding on a tubular thrust ring 23 which has a rib 24 integral with it. The outer periphery 25 of the rib is spherical and this fits with no more than working clearance in a counterbore 26 in the connection 16.

An annular flexible diaphragm 28 of rubber-like material by which the ring structure is sealed to the casing is sealingly clamped at its outer margin between clamping surfaces in the casing 11 and on the end connection 16. The inner margin of the diaphragm is sealingly clamped between the front surface 27 of the rib, which is square to the axis, and the back of member 22, by spring means here exemplified by a crinkle spring 31 of circular section wire abutting between the rear surface 29 of the rib 24 and the end surface 32 of the counter bore 25.

The spring not only provides for clamping the inner margin of the diaphragm but constantly urges the ring structure towards the plug. It will be seen that in addition the fluid pressure within the valve casing in the region of the ring structure has access to the back of the ring structure and acts to urge the structure towards the plug. The pressure may also have access to areas so disposed that the fluid pressure acting on them urges the ring structure away from the plug but these are so dimensioned that the net effect is always to urge the ring structure towards the plug, in other words the area over which the pressure acts towards the plug is greater than the area over which the pressure acts away from the plug. The latter area in this example is determined by the diameter of a counterbore 33 at the seating area end of the tubular member 22.

In this example the bore 34 in the casing 11 through which the seating ring 22 and thrust ring 23 project is of the same diameter as the counterbore 26. The outside diameter of the ring 22 is however such that there is clearance round it in the bore 34 substantially greater than the mere working clearance between the periphery 25 of the rib 24 and the counterbore 26, thus in conjunction with the flexibility of the diaphragm 28 enabling the ring structure to rock about an axis transverse to the bore of the ring structure and, due to the provision of the rib 24, lying in the transverse plane in which the contact (or near contact) of the periphery 25 with the counterbore 26 lies.

The extreme rocked position of the ring, which is limited by the inner end 35 of the bore 34, is shown, somewhat exaggerated, in FIG. 2, the axis of rock being perpendicular to the drawing. This axis may be regarded as lying at 30 but in actual operation, rocking will probably commence at the point of contact of the periphery 25 with the counterbore 26.

Although rocking can take place on any transverse axis so that for example the seating ring can accommodate inaccuracies in the relative positioning of the ring structure and plug, if the ring should stick to the plug, the ring will be pressed by the plug in such direction that rocking will be about an axis in the plane, or a plane parallel with the plane, of FIG. 1. If FIG. 2 is regarded as illustrating this case the section represented by FIG. 2 will be on the mid-plane normal to FIG. 1. It will be clear from a consideration of FIG. 2 that in these circumstances the rocking of the ring is accompanied by a pulling of the ring away from the plug, the movement of the ring away from the plug being greatest at the top of FIG. 2 and falling to zero at the bottom of FIG. 2.

In FIG. 3 instead of a rubber-like diaphragm to seal the ring structure to the casing a metal diaphragm 36 is used which may have annular corrugations 37 to increase its flexibility, its inner margin 38 (which may extend axially) being soldered or similarly hermetically attached to a tubular member 39 and its outer margin being embedded in rubber-like material 41 to facilitate a tight joint with the casing. Here the diaphragm may provide the spring pressure of the ring structure towards the plug or a separate spring as in FIG. 1 may be used.

In another alternative shown in FIG. 4 a metallic or plastic bellows 42 has its front end 43 sealed to a tubular member 44 and its rear end 45, turned outwardly, clamped or otherwise sealed to the casing.

The invention also provides other types of seal to be used between the ring structure and casing which are connected to the ring structure between the front surface of the rib which is formed on a thrust ring and the rear surface of a tubular member and are of such a character as to be urged into sealing contact with the counterbore under what may be termed live loading, that is by the axial pressure exerted by the spring and/or by the fluid pressure on the back of the ring structure, without preventing the ring structure from rocking on the rib. The spring alone may be used if the controlled pressure is low, but for high pressures the fluid pressure either alone or in addition to the spring is used because then the sealing pressure will be determined by the controlled pressure.

One such seal is a chevron or similar seal indicated diagrammatically at 46, FIG. 5, between the front surface of the rib 24 and a tubular member 47, which may be of plastics material or metal; in the case of metal thin laminations are used to ensure adequate resilience to give a satisfactory seal together with ability to rock.

Figure 6:
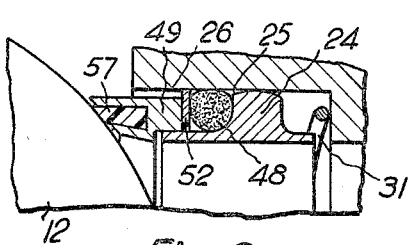
Figure 7:
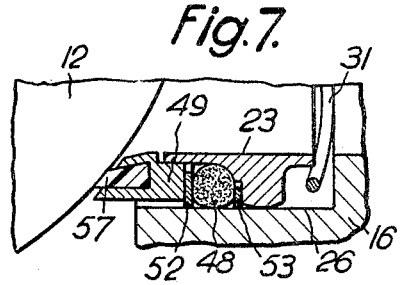
Figure 8:
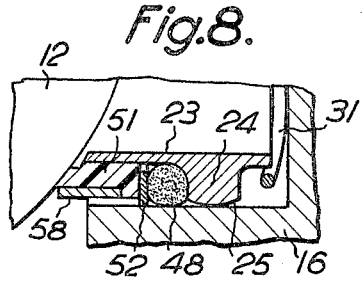

Another possibility illustrated in FIGS. 6, 7 and 8 is an O-ring 48 lodged between the front surface of the rib 24 and the rear surface of a tubular member 49 FIGS. 6 and 7 or 51 FIG. 8. The live loading then not only ensures sealing pressure dependent on the controlled pressure but also takes care of any reasonable shrinkage of the material of the O-ring.

With very high pressures an anti-extrusion ring to protect the O-ring is desirable or necessary and the two part ring structure enables an anti-extrusion ring which efficiently serves the purposes to be used. It may take the form of a washer 52 between the rear end of the tubular member 49 or 51 and the O-ring 48, the washer just fitting in the counterbore 26 while its internal diameter is such as to allow the ring structure the requisite amount of rock. A similar washer 53 may be used between the O-ring 48 and the front surface of the rib 24 as shown in FIG. 7 but is usually unnecessary because the rib itself serves the purpose.

With an O-ring 48, under normal conditions the seal itself tends to centre the rib 24 so that it is clear of the counterbore 26 all round by the working clearance provided. If the seating sticks to the obturating member as soon as the latter moves, the ring structure tips on the O-ring until the very slight working clearance around the rib is taken up and the action is thereafter as described above with reference to FIGS. 1 and 2.

It will be noted that with these chevron and O-ring seals, when the structure rocks, the radial space in which the seal is accommodated is increased on one side and decreased on the other, but since the seal is located between the rib 24 and the outer end of the counterbore 26 the radial displacement at the location of the seal is less than that at the end of the counterbore, and the sealing effect can therefore be maintained with a reasonable value of rock.

Figure 9:
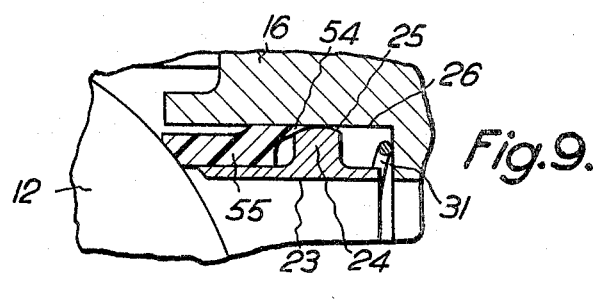
Figure 10:
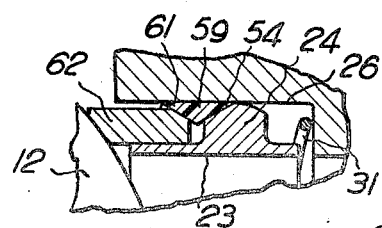

An alternative to an O-ring, illustrated in FIG. 9, comprises a sealing lip 54 of material having sufficient flexibility, for example of plastics material, at the rear end of a tubular member 55, which enters the clearance between the periphery 25 of the rib 24 and the counterbore 26. As with an O-ring the seal itself tends to centre the rib with the result above described with reference to an O-ring. As the lip is directly adjacent the line of working clearance round the rib, the seal is practically unaffected by rocking of the ring structure.

The seating surface itself may be provided in various ways illustrated in the drawings but it is to be understood that in general any form of seating surface illustrated and described below may be used in conjunction with any of the ways of sealing the ring structure to the valve casing illustrated and described above.

In FIGS. 1 and 2 the tubular member 22 is of plastics material of a suitable grade itself to provide a seating surface as well as to constitute the tubular member while in FIGS. 3 and 4 the whole ring structure is in a single piece of such a plastics material. In FIG. 5 the tubular member 47 comprises a metallic core covered with a suitable grade of plastics material. In FIGS. 6 and 7 the tubular member 49 is of metal but it receives in a groove in its end a ring 57 of plastics material which provides the actual seating surface. In FIG. 8 the tubular member 51 is of plastics material and provides the actual seating surface, but it is externally reinforced by a metal shroud 58. In FIG. 9 the tubular member 55 is integral with the lip 54 and provides the actual seating surface, FIG. 10 in which a sealing ring 59 as well as having the lip 54 has a similar lip 61 co-operating with the tubular member 62.

It has been found that valves equipped with seatings according to the present invention can be used successfully for substantially higher pressures than the prior art valves. Thus with a bore of two inches (5 cm.) the valves are tight at pressures up to 2000 lbs. per square inch (130 kg. per square cm.) while with smaller bores higher pressures can be dealt with.

By suitable choice of materials the valves can also be made suitable for operation at high temperature. Thus the plastics material may be PTFE (polytetrafluoro-ethylene), which can be used at temperatures up to about 300° C. and other plastics materials are commercially available which can be used up to 400°, while metals can go still higher.

The present invention has been illustrated in the drawings as applied to plug cocks, having spherical plugs, to which the invention is especially applicable. It can also be applied to plug cocks with other forms of plug, and to gate valves.

In all cases as described above with reference to FIG. 1 the controlled fluid may have access to the rear end of the seating structure (including the diaphragm if used) the relative areas being chosen so that the pressure urging the seating against the obturating member overbalances that acting the other way by an appropriate margin. The spring (or the elasticity of a metal bellows or diaphragm) ensures a suitable minimum pressure when the fluid pressure is zero.

It will be understood that though reference is made only to one ring above, usually there will be two similar ring structures respectively on opposite sides of the obturating member, or in the case of a multi-way cock, one at each port in the casing.

I claim:

1. A valve seating arrangement including a seating ring for effecting a seal between an obturating member which slides relatively to the ring, and a valve casing, the ring also being sealed to the casing and pressed axially against the obturating member, in which the ring includes in its structure at a substantial distance behind the actual seating area a substantially rigid annular rib having a convex outer surface which fits with no more than working clearance in a bore in the valve casing, said bore being cylindrical in this region, while towards the region of the actual seating area there is substantially greater clearance round the ring structure continued far enough to enable the ring structure as a whole to rock in relation to the casing on any transverse axis through the rib, the rib being rigid with a thrust ring and the seating area being provided on a tubular member slidable axially in relation to the thrust ring and having a sealing connection with means for sealing the ring to the valve casing.

2. A valve seating arrangement according to claim 1 in which the rib is rigid with the part on which the actual seating area is provided.

3. A valve seating arrangement according to claim 1 in which the ring structure is sealed to the valve casing by a chevron seal located between the rear end of the tubular member and a transverse surface in front of the rib.

4. A valve seating arrangement according to claim 1 in which the rear end of the tubular member has a flexible sealing lip by which the ring structure is sealed to the valve casing.

5. A valve seating arrangement according to claim 1 in which the ring structure is sealed to the valve casing by an O-ring engaged between the rear end of the tubular member and a transverse surface in front of the rib.

6. A valve seating arrangement according to claim 5 in which an anti-extrusion ring is provided between the rear end of the tubular member and the O-ring, having an internal diameter such as to permit rocking of the ring structure within the limits imposed by the clearance round the ring structure in the region of the actual seating area.

7. A valve seating arrangement according to claim 6 in which a second anti-extrusion ring is provided between the front surface of the rib and the O-ring.

8. A valve seating arrangement including a seating ring having a seating area for effecting a seal between an obturating member which slides relatively to the ring, and a valve casing, the ring also being sealed to the casing and pressed axially against the obturating member, wherein the improvement comprises a ring structure which includes a thrust ring, a substantially rigid annular rib rigid with the thrust ring and located at a substantial distance behind the actual seating area, said rib having a convex outer surface which fits with no more than working clearance in a bore in the valve casing, the bore being cylindrical in this region, a tubular member whereon the actual seating area is provided, said tubular member being slidable axially in relation to the thrust ring, and a sealing connection between said tubular member and means for sealing the ring structure to the valve casing, said bore towards the region of the actual seating area providing sufficient clearance round the ring structure to enable the ring structure as a whole to rock in relation to the valve casing and to the obturating member on any transverse axis through the rib.

References Cited by the Examiner

UNITED STATES PATENTS

| | | | |
|---|---|---|---|
| 1,752,456 | 4/1930 | Pillott. | |
| 2,520,288 | 8/1950 | Shand | 251—174 |
| 2,603,449 | 7/1952 | Overholser | 251—172 |
| 2,799,470 | 7/1957 | Margrave | 251—172 |
| 2,886,282 | 5/1959 | Miller | 151—172 |
| 3,043,469 | 7/1962 | Leach | 251—172 X |
| 3,056,577 | 10/1962 | Kulisik | 251—315 |

FOREIGN PATENTS

| | | |
|---|---|---|
| 1,251,575 | 12/1960 | France. |
| 1,263,041 | 4/1961 | France. |

WILLIAM F. O'DEA, *Primary Examiner.*

CLARENCE R. GORDON, ISADOR WEIL,
*Examiners.*